Jan. 26, 1926.  1,570,663
A. A. WYCKOFF
PNEUMATIC VEHICLE TIRE CASING
Filed Oct. 4, 1924
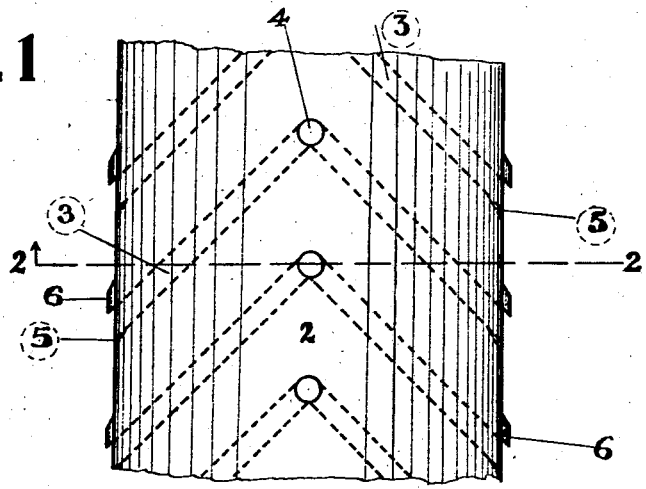
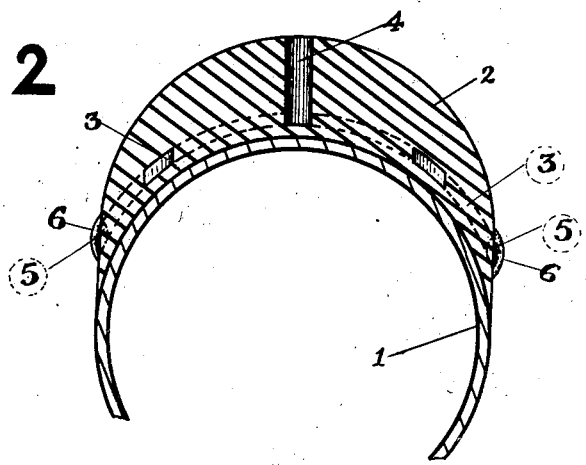
INVENTOR
Amos A. Wyckoff
BY
J. E. Trabucco
ATTORNEY Patented Jan. 26, 1926.

1,570,663

UNITED STATES PATENT OFFICE.

AMOS A. WYCKOFF, OF OAKLAND, CALIFORNIA.

PNEUMATIC VEHICLE TIRE CASING.

Application filed October 4, 1924. Serial No. 741,568.

*To all whom it may concern:*

Be it known that I, AMOS A. WYCKOFF, a citizen of the United States, and a resident of Oakland, in the county of Alameda and State of California, have invented new and useful Improvements in Pneumatic Vehicle Tire Casings, of which the following is a specification.

This invention relates to a pneumatic tire casing for vehicles, the tread of which is provided with a number of recesses for the circulation of air, whereby the tire is made more resilient and prevented from becoming overheated.

An object of this invention is to provide a pneumatic tire for vehicles, in the tread of which there are numerous recesses for the circulation of air, whereby the tire is made more resilient.

Another object of this invention is to provide a pneumatic tire so constructed that the tread on the same as well as the inner tube therein are prevented from becoming overheated.

With these and other objects in view, the invention consists in the novel construction, arrangement and formation of parts, as will be hereinafter more specifically described, claimed and illustrated in the accompanying drawings, forming a part of this specification, in which drawings:

Fig. 1 is a fragmentary plan view of the tire tread, showing the location and arrangement of the air recesses in the same; and Fig. 2 is a sectional view of the pneumatic tire taken on the line 2—2 of Fig. 1, showing in detail the construction of the tread thereof.

Referring to the drawings, numeral 1 represents a pneumatic tire casing of the ordinary type to which is attached by vulcanizing in the usual way a thick rubber tread 2. The tread 2 is provided with a plurality of V-shaped recesses or holes 3 each of which extend from the outer edges of the tread near the fabric of the casing 1 to an apex inside of and near the central part of the tread. The tread 2 is provided with a plurality of radial openings 4 which extend from points at the outer central surface of the tread to the points under the surface of the tread where the holes 3 meet. Thus each V-shaped hole meets a radial opening 4 at its apex, thereby providing a means for the circulation of the air from the outer sides of the tread, through the same and out through the central portion thereof. The sides of the tread are provided at the openings where holes 3 occur, with indentations 5, which assist, when the tire revolves, in catching the air and forcing the same through the holes 3. The sides of the tread are also provided, where the holes 3 occur, with projections 6, extending outwardly near the edge of each hole, which projections further assist to catch and force the air through the holes 3.

The tire herein shown, as can be plainly seen, has more satisfactory resilient qualities than the ordinary pneumatic tire, and owing to the fact that air is constantly circulating through the tread, the inner tube and the entire tire casing are kept comparatively cooler than ordinary tires operated under similar conditions.

Having described my invention, what I claim is:

1. A pneumatic tire having a tread provided with circumferentially extending series of V-shaped holes which extend from the sides of the tread to apexes near the central portion of the tread, and a series of openings extending from points near the outer circumferential surface of the tread to the apexes inside thereof where the first mentioned holes meet.

2. A pneumatic tire having thereon a tread provided therein with a series of V-shaped holes which extend from the sides of the tread to points located at central points within the tread, and a series of radial openings extending from points on the outer surface of the tread to the said points where the holes meet.

AMOS A. WYCKOFF.